(12) United States Patent
Zendejas-Martinez (10) Patent No.: US 7,608,129 B2
(45) Date of Patent: Oct. 27, 2009

(54) METHOD AND APPARATUS FOR PRODUCING DIRECT REDUCED IRON

(75) Inventor: Eugenio Zendejas-Martinez, Nuevo Leon (MX)

(73) Assignee: HYL Technologies S.A. de C.V., San Nicolas de la Garza, N.L. (ME)

( * ) Notice: Subject to any disclaimer, the term of this patent is extended or adjusted under 35 U.S.C. 154(b) by 330 days.

(21) Appl. No.: 11/379,943

(22) Filed: Apr. 24, 2006

(65) Prior Publication Data

US 2007/0245855 A1    Oct. 25, 2007

(51) Int. Cl.
  *C21B 13/02*   (2006.01)
  *F04F 5/00*    (2006.01)

(52) U.S. Cl. .............................. 75/496; 75/505; 266/156

(58) Field of Classification Search ................... 75/488, 75/489, 490, 496, 505; 266/156; 417/65, 417/76, 87, 151
See application file for complete search history.

(56) References Cited

U.S. PATENT DOCUMENTS

| | | | |
|---|---|---|---|
| 2,915,379 A * | 12/1959 | Agarwal | 75/444 |
| 4,046,557 A | 9/1977 | Beggs | |
| 4,049,440 A | 9/1977 | Beggs | |
| 4,130,575 A * | 12/1978 | Jorn | 518/705 |
| 4,325,731 A | 4/1982 | Becker et al. | |
| 4,556,417 A | 12/1985 | Martinez-Vera et al. | |
| 5,110,350 A | 5/1992 | Villarreal-Trevino et al. | |
| 5,437,708 A | 8/1995 | Meissner et al. | |
| 5,858,057 A | 1/1999 | Celada-Gonzalez et al. | |

(Continued)

FOREIGN PATENT DOCUMENTS

DE        1033902    *  7/1958

(Continued)

OTHER PUBLICATIONS

J.A. Lepinski, "Iron by Direct Reduction" in Kirk-Othmer Encyclopedia of Chemical Technology, Dec. 4, 2000, p. 1-16.*

(Continued)

*Primary Examiner*—George Wyszomierski
*Assistant Examiner*—Mark L Shevin
(74) *Attorney, Agent, or Firm*—Frommer Lawrence & Haug LLP; A. Thomas S. Safford (57) ABSTRACT

A direct reduction process for producing direct reduced iron (DRI) in a reduction reactor having a reduction zone for reducing iron-oxides-containing particles, such as iron ore pellets, to DRI by reaction of said iron oxides with a high temperature reducing gas, and a cooling zone for lowering the temperature of the DRI produced in said reduction zone, wherein a stream of cooling gas, usually natural gas, is circulated through said cooling zone, a portion of said cooling gas is withdrawn from the cooling zone, cooled and cleaned in a gas cooler and a portion of the cooled gas is recycled to said reduction zone by means of an ejector utilizing the high-pressure natural gas make-up feed as the ejector's motive fluid. Using an ejector for recycling the cooling gas instead of using a mechanical compressor provides significant savings in electricity and in capital, operational and maintenance costs. A direct reduction plant having a DRI cooling zone which uses at least one ejector in recycling at least a portion of cooling gas to the cooling zone.

12 Claims, 4 Drawing Sheets

U.S. PATENT DOCUMENTS

| | | | |
|---|---|---|---|
| 6,027,545 A * | 2/2000 | Villarreal-Trevino | 75/490 |
| 6,200,363 B1 * | 3/2001 | Whitten et al. | 75/488 |
| 6,319,301 B1 | 11/2001 | Bueno et al. | |
| 6,508,998 B1 | 1/2003 | Nasato | |
| 6,551,549 B2 | 4/2003 | Bueno et al. | |
| 6,818,198 B2 | 11/2004 | Singh et al. | |

FOREIGN PATENT DOCUMENTS

| | | |
|---|---|---|
| DE | 4010602 A1 | 11/1990 |
| DE | 4010603 A1 | 11/1990 |
| GB | 02231039 A | 11/1990 |
| GB | 02231040 A | 11/1990 |
| GB | 2265380 A * | 9/1993 |

OTHER PUBLICATIONS

A.M. Jumpeter, "Jet Pump Applications", in Pump Handbook, McGraw-Hll, 2001, p. 4.23-4.49).*

* cited by examiner

METHOD AND APPARATUS FOR PRODUCING DIRECT REDUCED IRON

FIELD OF THE INVENTION

The present invention relates to processes for the direct reduction of iron oxide particles to still solid particles containing mainly metallic iron by the use of recirculated and regenerated hot reducing gases. Most typically, the hot reduced particles are cooled with a recirculating cooling gas with natural gas added as make up to the cooling gas.

BACKGROUND OF THE INVENTION

The present invention is thus directed to the direct reduction of iron oxide particles to produce direct reduced iron (DRI), also known in the industry as sponge iron. More specifically, the present invention is directed to improvements in the methods and equipment employed for recycling cooling gas to the cooling zone of a direct reduction reactor.

For the nearly fifty years of commercial production DRI, the reducing and cooling gases have been recirculated by means of large and expensive compressors.

In the present invention, the normal compressor utilized for circulating the stream of cooling gas through the lower portion of a direct reduction reactor is preferably replaced, or at least supplemented, by at least one gas ejector; resulting unexpectedly in previously unrecognized and surprisingly effective important technical and economic advantages. As discussed in greater detail below, savings in the millions of dollars in reduced large initial capital costs and as well as greatly reduced operational savings in electrical energy and upkeep result.

Direct reduction processes are currently utilized in the steel industry as an alternative to blast furnaces, mainly in areas where natural gas is available and relatively low-capacity steelmaking plants are desired. Direct reduction processes of the moving bed type are exemplified by U.S. Pat. Nos. 4,049,440; 4,556,417; 5,858,057; 5,110,350; 5,437,708; and 6,319,301. In these processes, iron-containing particles in the form of pellets, lumps or mixtures thereof are charged to a reduction zone in the upper part of a moving bed shaft-type reduction reactor where the iron oxides of the ore particles are chemically reduced to metallic iron by means of a high-temperature reducing gas. The reduced and metallized iron particles or DRI (direct reduced iron) at a temperature above about 800° C. are discharged from said reduction reactor through a cooling zone in its lower part, where commonly they are cooled down to about ambient temperature to prevent re-oxidation of the DRI when discharged and contacted with air. To this end, a non-oxidizing gas stream is circulated in a cooling loop comprising the cooling zone of the reactor, a gas cooler for extracting the heat taken by the cooling gas from the hot DRI, a cooling gas compressor for recycling a major portion of said cooling gas back to said cooling zone and suitable connecting piping and control means for a continuous operation of said cooling gas loop. Usually, the gas utilized as cooling medium is natural gas mixed with reducing gas containing hydrogen and carbon monoxide. Even if pure natural gas is circulated as cooling gas through the cooling zone, the hydrocarbons present in the natural gas (methane, ethane, propane, aromatics, etc) will in some proportion, depending on the temperatures and time encountered, partially transform into hydrogen and carbon monoxide through the catalytic action of the DRI at the temperatures encountered by said cooling gas in the cooling zone.

Gas ejectors are currently utilized in several industrial processes and plants for moving gas streams. Some examples of suggested ejector applications are described below.

German Laid-Open Patent Applications Nos. DE 4010602 and DE 4010603 describe a process for ammonia production where an ejector is used for upstream recycling of a gas stream using a higher pressure gas stream from the same process. The processes shown in these applications are different and in both of them an ejector is utilized instead of a compressor for increasing the pressure of a gas so that it can be fed to the first steps of the process.

U.S. Pat. No. 6,508,998 issued to Nasato discloses the use of an ejector in a Claus plant for sulfur recovery from a hydrogen sulfide containing gas. An ejector is employed for recycling a portion of the gas effluent from the oxidation and heat-recovery vessels to the burner of the oxidizing reactor. The motive fluid for the ejector may be selected from steam, air, nitrogen, carbon dioxide, sulfur dioxide or other compatible gases.

U.S. Pat. No. 6,818,198 issued to Singh et al. discloses an autothermal reforming process wherein a portion of the syngas produced is recycled to the reformer utilizing an ejector 124 wherein the motive fluid stream is a mixture of hydrocarbon and steam. In this case the ejector also serves as a mixer of the feed gas to the reformer and recycled syngas product. Syngas recycling increases the proportion of hydrogen in the product gas.

U.S. Pat. No. 4,325,731, issued Apr. 20, 1982 (with a 1979 priority date) is the only one known to Applicant and his assignee that even has a suggestion of any use of an ejector in conjunction with a DRI reduction reactor. This patent is completely silent as regards any cooling of the DRI.

This patent only incidentally shows an ejector 7 using gasifier product 6 as the motive gas to mix with and feed a reformer 10 with scrubbed depleted reducing gas 8 from a reduction reactor 12. This feature was not claimed. Even the suggested use of ejectors apparently has not proven practical (for recycling reducing gas). Contrary to the suggestion in this quarter-century old reference, Applicant and his assignee are not aware that this suggestion has ever been commercially implemented or proven to have been effective or beneficial in such an application.

More to the point, there is no suggestion whatsoever in this patent to use an ejector in the cooling gas recycle loop of a DRI reduction plant, much less any recognition of the many advantages thereof; especially including being able to take advantage of the high pressure natural gas supply that is furnished from outside merchant sources and thus exist as a "free" motive energy source. All this is in spite of such pressurized natural gas having been used as a feed stock source in commercial DRI plants for almost 50 years and never before having been taken advantage of in this way.

It should be noted that a given volume of natural gas, upon being reformed, gives a gas that increases in volume four times. Thus, if the volume of gas fed as make-up feed stock to the reducing gas loop in a commercially viable DRI plant is insufficient to drive an ejector to circulate the recycle reducing gas; then this insufficiency would be even greater where the make-up is a fractionally smaller volume of unreformed natural gas. Yet the Applicant surprisingly has found that the volume of make up, even in the form of natural gas, when fed to the cooling zone is effective to drive ejector(s) sufficient to replace the compressor used in the cooling gas recycle loop. Another reason, that in hindsight can be seen to make this viable in the cooling zone, is that the pressure needed to drive the recycle gas in the cooling gas loop is typically on the order of less than one fifth of that needed to drive recycle gas in the reducing gas loop. The cooling gas loop essentially has only the cooling zone and the cooler/scrubber, while the reducing gas loop will at least in addition also have a heater and/or a reformer (see 10 in the '731 patent).

Documents cited in this text (including the foregoing patents), and all documents cited or referenced in the documents cited in this text, are incorporated herein by reference. Documents incorporated by reference into this text or any teachings therein may be used in the practice of this invention.

The present invention thus overcomes several shortcomings of the relevant prior art for the production of DRI, by utilizing for the first time an ejector in the cooling loop and where, for the first time in the almost 50-year commercial production of DRI, the high-pressure of the commonly-present natural gas make-up feed is utilized as the motive power for an ejector to mix with and drive any recycle gas. This invention in using ejector(s) replaces the conventional large mechanical compressor for circulating cooling gas; or, in existing installations, at the very least gives relatively inexpensive support for such a compressor and thus additionally avoids the capital and upkeep costs of a no longer needed, dramatically more expensive, stand-by or supplemental compressor).

SUMMARY OF THE INVENTION

The present invention is directed to a process for reducing iron oxides in iron ores to metallic iron (DRI) in the solid state in a moving bed reactor by means of a high-temperature reducing gas, where the DRI produced in the reduction zone is cooled down in a cooling zone of the reactor or in a separate cooling vessel by contact with a cooling gas stream which is recycled to said cooling zone by means of an ejector; preferably utilizing the motive power derived from the existing high pressure stream of natural gas already being fed as make up to the recycle cooling gas stream.

It is therefore an object of the present invention to provide a process and apparatus for the direct reduction of iron ores with important savings in capital and operational expenses over existing processes and apparatus for the production of DRI.

It is another object of the present invention to provide a process and apparatus for the direct reduction of iron ores that requires less expensive equipment and less electrical energy than other similar processes now in operation.

The objects of the invention are generally achieved by providing a method for producing direct reduced iron (DRI) in a reduction reactor comprising a reduction zone in its upper part and a cooling zone in its lower part; a reducing gas loop comprising said reduction zone and a cooling gas loop comprising said cooling zone and an ejector for recycling cooling gas to said cooling zone; wherein said method comprises feeding iron oxides-containing particles to said reduction zone; reducing said iron oxides to metallic iron in said reduction zone by reacting said iron oxides with a high-temperature reducing gas comprising hydrogen and carbon monoxide to produce said DRI; causing said DRI to flow to said cooling zone; circulating a cooling gas stream through said cooling zone to cool-down said DRI; withdrawing at least a portion of said cooling gas from said cooling zone; cooling said withdrawn cooling gas; feeding as a motive fluid to said ejector a high-pressure gas stream and as the driven fluid at least a portion of said cooling gas; and discharging the DRI from said cooling zone.

In its broader aspects, the motive fluid for the ejector may be natural gas or otherwise selected from any pressurized inert or reducing gas compatible with the Direct Reduction process.

The objects of the invention are also achieved by an apparatus for producing DRI comprising a reduction reactor having a reduction zone in its upper part and a cooling zone in its lower part; means for charging iron-oxides-containing particles to said reduction zone wherein said iron oxides are reduced to metallic iron by reacting said iron oxides with a high-temperature reducing gas comprising hydrogen and carbon monoxide to produce said DRI; means for circulating a cooling gas stream in a cooling-gas loop comprising said cooling zone to cool down said DRI; means for withdrawing at least a portion of said cooling gas from said cooling zone; means for cooling said withdrawn cooling gas; an ejector for recycling a portion of said cooled cooling gas to said cooling zone by feeding as a motive fluid to said ejector a high-pressure gas stream and as the driven fluid at least a portion of said cooling gas; and means for discharging the DRI from said cooling zone.

In a variation of the present invention, the process and apparatus for reducing iron ores to metallic iron (DRI) incorporate at least one ejector installed in parallel with the cooling gas compressor (especially in a retrofit for existing installations), whereby the ejector is used whenever said cooling gas compressor is unavailable or is shut down for maintenance (or vice versa). In yet another variation two ejectors are installed in parallel and operate as needed, together, alternately, or with one backing up the other.

DETAILED DESCRIPTION OF PREFERRED EMBODIMENTS OF THE INVENTION

References to the figures have been arranged so that the same numerals designate similar elements in all figures.

Figure 1:
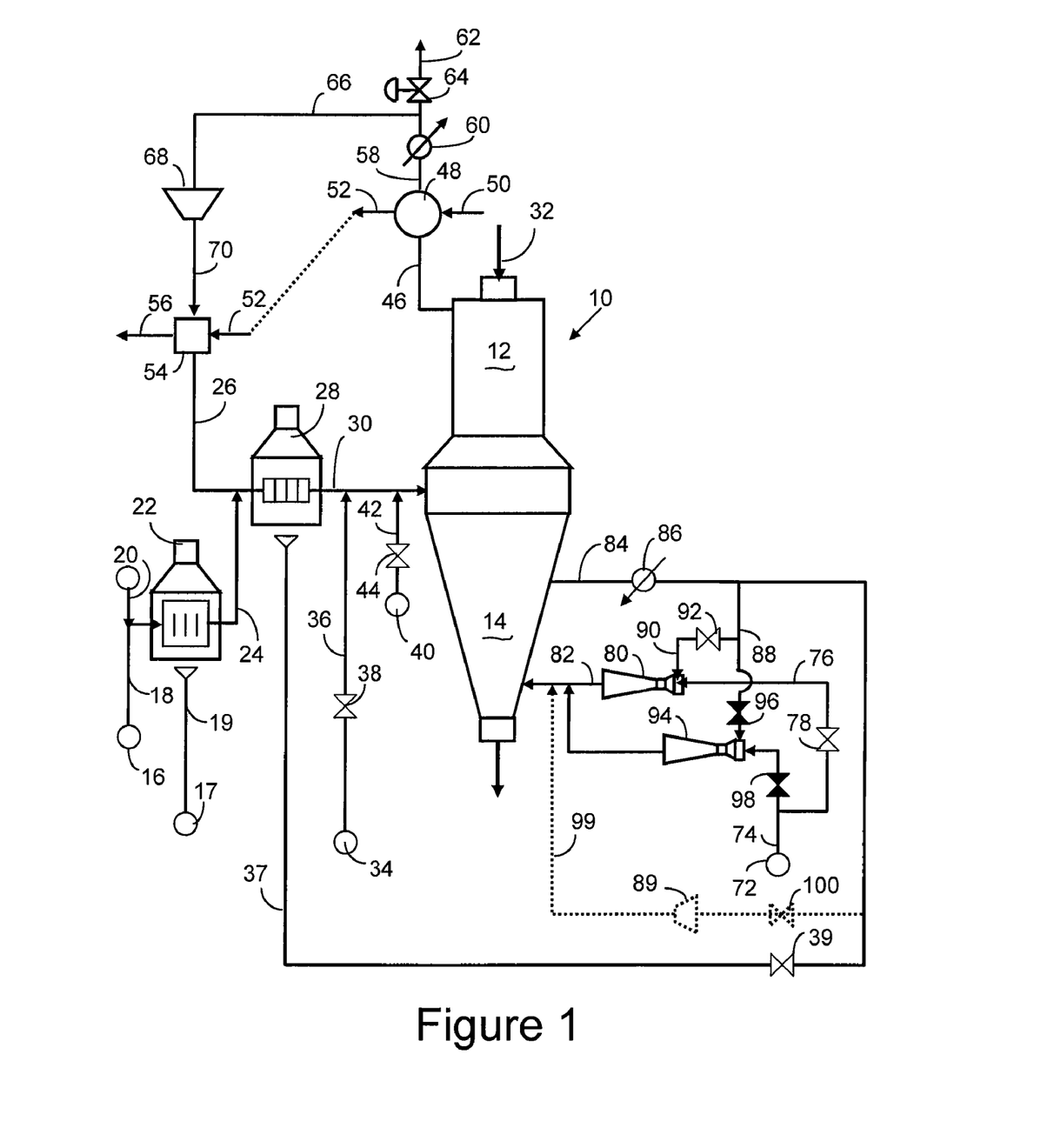
FIG. 1 is a schematic representation of a first embodiment of the direct reduction process according to the present invention, where the reducing gas circulated through the reduction zone is produced in a reformer and the cleaned and cooled recycle cooling gas is driven back to the cooling zone of the reduction reactor by an ejector using the high-pressure natural gas make-up gas as the motive gas stream.

Referring to FIG. 1, numeral 10 generally designates a reduction reactor having a reduction zone 12 in its upper part and a cooling zone 14 in its lower part. Natural gas supplied from a suitable source 16 is fed through pipe 18 with steam and/or $CO_2$ from a source 20 to a reformer 22 where hydrocarbons (mainly methane) present in said natural gas react with water/$CO_2$ to produce hydrogen and carbon monoxide in the presence of a nickel catalyst. The reformed gas is added through pipe 24 (after heat recuperation and cooling not shown for simplicity) to the reducing gas recycle loop by combining the fresh reformed gas produced off-line with reducing gas being recycled through the pipe 26. The thus-combined stream is heated to temperature above about 850° C. in heater 28. The resulting hot enhanced recycle reducing gas is fed through pipe 30 to reduction zone 12 where it contacts, and reduces to DRI 33, the iron ore particles 32 fed into the upper part of said reduction zone 12. Reacted residual reducing gas is withdrawn as an effluent with depleted reducing capacity from said reduction zone 12 through pipe 46 and fed to heat exchanger 48 wherein it transfers heat to water 50 to produce steam 52. This steam 52 may be used in other parts of the reduction plant, for example in system 54 for the removal of $CO_2$, discharged via pipe 56. After passing through heat exchanger 48, the reducing gas flows through pipe 58 to a cooler 60, usually of the direct contact type. There the gas is contacted with cool water whereby the hot water by-product of the reduction reactions in zone 12 is condensed and removed from the reducing gas. A portion of the cooled reducing gas is purged from the system through pipe 62 and pressure control valve 64. This purged reducing gas from pipe 62 may be used as fuel to be fed as at least part of source 17 via line 19 to heat the reformer 22 and/or fed optionally to heat the gas heater 28 (a variation not shown, for simplicity). The major portion of the cooled reducing gas flows through pipe 66 and is pressurized by compressor 68 for recycling ultimately back to the reduction zone 12. The pressurized recycle reducing gas is fed via pipe 70 to a $CO_2$ removal system 54, normally of the chemical absorption type wherein carbon dioxide is absorbed in a liquid stream containing amines. In some cases however, this $CO_2$ removal system 54 may be of the physical adsorption type, known as (pressure swing adsorption) PSA or (vacuum swing adsorption) VSA. The recycle reducing gas with lowered amounts of water and carbon dioxide is heated in heater 28 to a temperature above about 850° C. before it is fed back to the reduction zone 12. The hot reducing gas may be combined with a hydrocarbon from source 34 through pipe 36 provided with control valve 38 and with oxygen from source 40 through pipe 42 and valve 44 for further increasing its temperature to levels above about 1000° C. and at the same time for carrying out a reforming partial oxidation of the hydrocarbons thus increasing the reducing gas capacity of the recycle reducing gas.

Referring now to the cooling gas loop, high-pressure natural gas from a source 72 is fed through pipe 76 and valve 78 as motive fluid to ejector 80. A portion of the recycle cooling gas in pipe 90 is regulated by valve 92 and is recycled by the ejector 80 back into the cooling zone 14 via pipe 82. After cooling the DRI in the cooling zone, the warmed up cooling gas is withdrawn via pipe 84, cooled back down in cooler/scrubber 86 and fed on to the ejector(s) via pipe 88.

Utilization of natural gas as motive fluid for the ejector(s) in this preferred process provides significant advantages:

The cooled recycle gas in current DRI plants is prematurely heated by the mechanical compression of the compressors used; but this is avoided when the compressor is replaced by ejector(s); and therefore, the after-cooler which is normally associated with compressors is eliminated, thus further decreasing both capital and operational costs, while improving process parameters.

When the hydrocarbons present in the natural gas contact the hot DRI in the cooling zone 14, a portion of said hydrocarbons crack and decompose to simpler molecules and finally to hydrogen and carbon monoxide. Since the cracking reactions are endothermic, feeding the natural gas to the cooling zone contributes positively in the cooling of DRI.

Mechanical compressors are expensive pieces of equipment and require costly maintenance, therefore the substitution for the mechanical compressor by ejectors saves significant capital and operation costs of the process. For a new plant, the present invention represents a capital cost reduction on the order of 1 million dollars, which is the estimated cost of a compressor. The cost for ejectors with a similar capacity is on the order to 10 thousand dollars. Operation and maintenance of the direct reduction plant in accordance with the present invention is therefore significantly simplified.

In another preferred embodiment of the invention, a second ejector 94 is provided as a safety measure to assure operational continuity of the process as a back-up of the other. Ejector 94 is connected to the motive gas source 72 via pipe 74. Alternate operation of ejectors 80 and 94 as required is selected by means of valves 78, 98, 92 and 96 in order to isolate one of the ejectors. If more gas recycling capacity is desired than is within the capacity of one ejector, it is possible to simultaneously operate both and control the amount of cooling gas being recycled by appropriate manipulation of valves 78 and 98 (which regulate the flow rate of the motive fluid to the respective ejectors).

Figure 2:
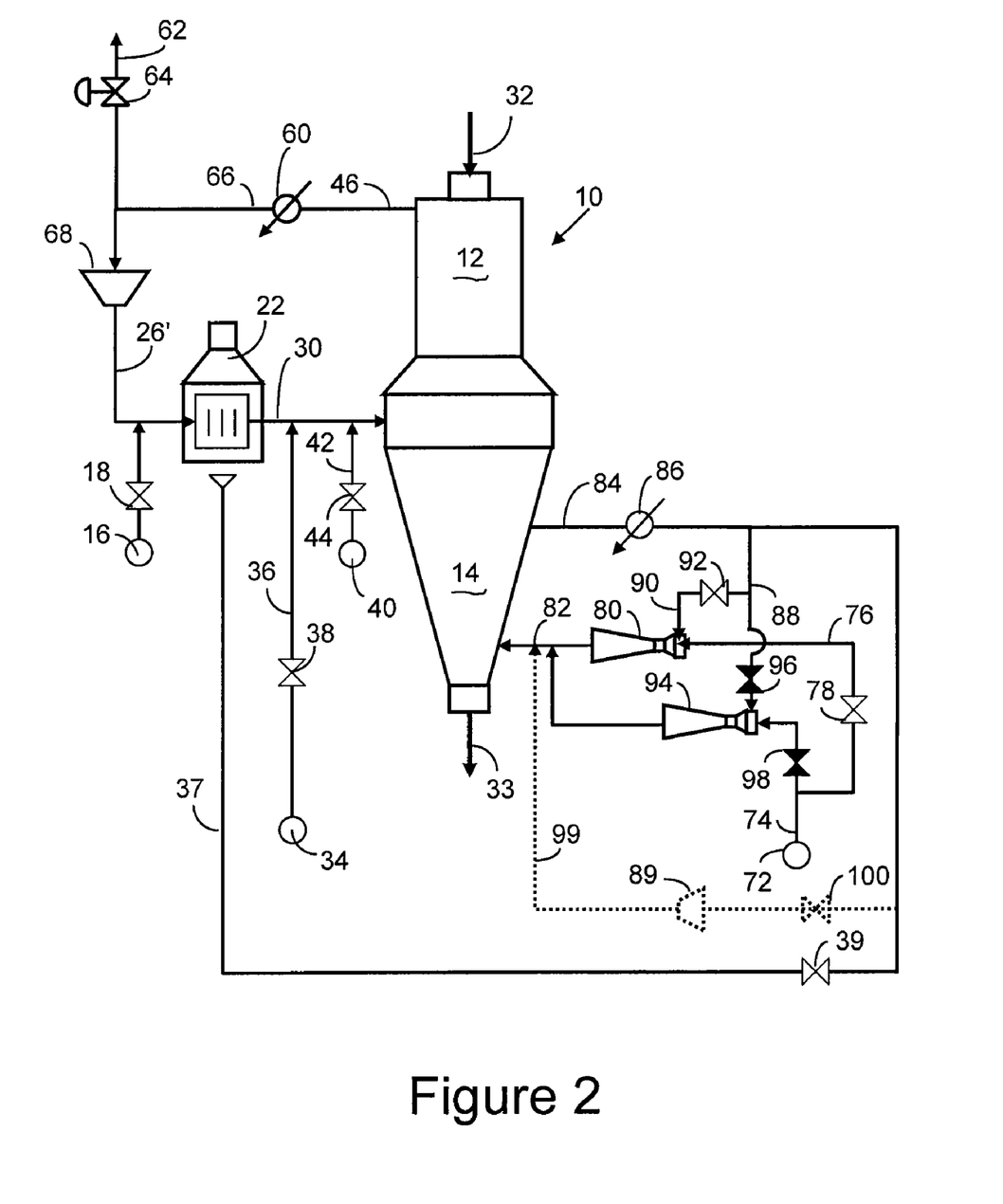
FIG. 2 is a schematic representation of a similar embodiment of the direct reduction process according to the present invention, also using an ejector in the cooling gas loop, but differing from the process of FIG. 1 in the configuration of the reducing gas loop (where the gas stream effluent from the reduction zone is recycled back to said reduction zone passing through a natural gas reformer).
Figure 3:
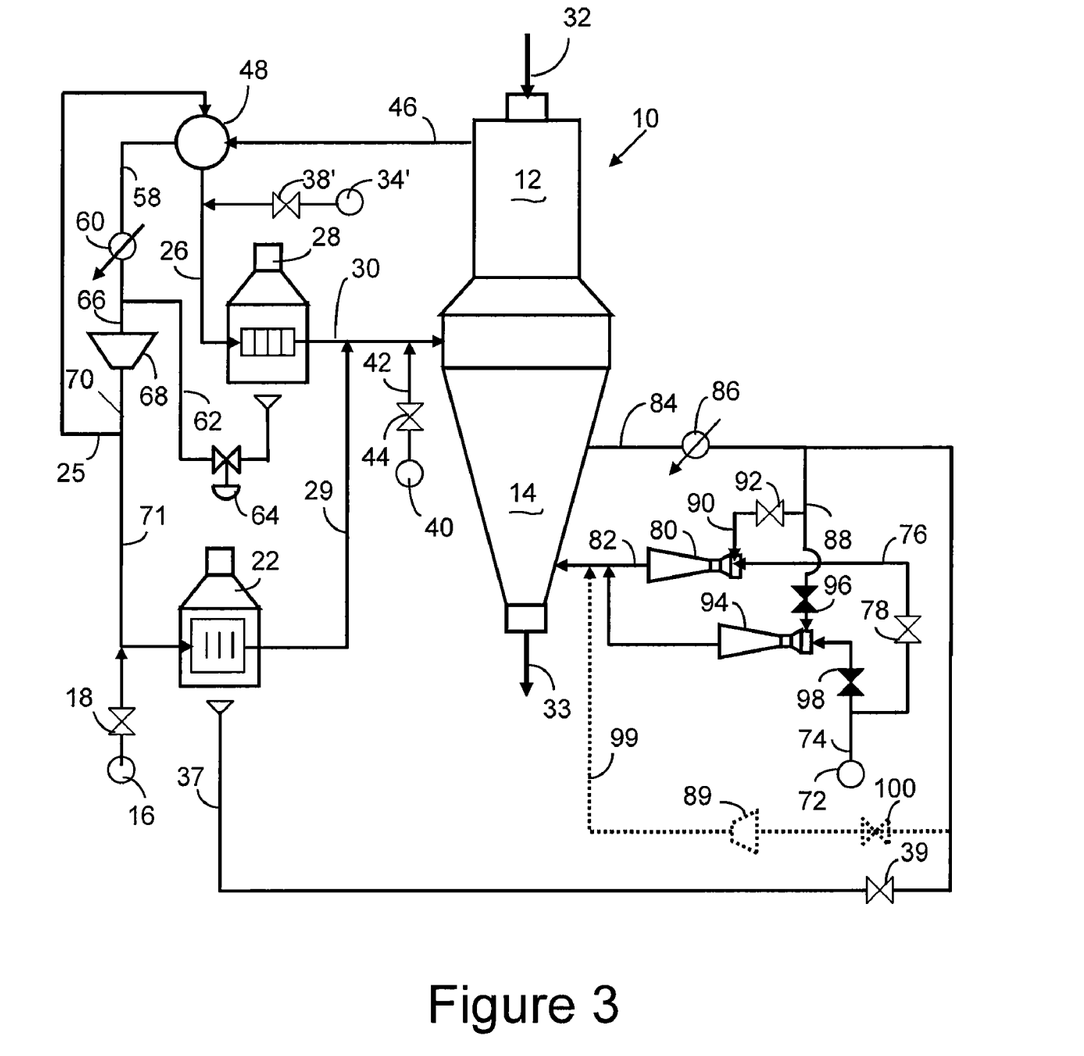
FIG. 3 is a schematic representation of a similar embodiment of the direct reduction process according to the present invention, also using an ejector in the cooling gas loop, but differing from the processes of FIGS. 1 and 2 in the configuration of the reducing gas loop (where a portion of the reducing gas effluent from the reduction reactor is recycled back to said reduction zone through a reformer and another portion through a heater).

A portion of the cooling gas circulating through the cooling gas loop may be utilized as fuel in the gas heater 28 by means of pipe 37 and valve 39 (and/or to heat the reformer 22, see for example FIGS. 2 & 3).

A mechanical compressor 89 and connecting pipe 99 have been shown in the figures in dotted lines to indicate that in another embodiment of the invention applicable to existing plants, the cooling compressor may be connected in parallel with the ejector(s) but preferably operating, under the control of the regulator valve 100, at a lower capacity or operating intermittently, if desired. Savings in operational and maintenance costs will be also achieved, even if ejectors 80 and 94 are utilized only intermittently.

In retrofitting an existing plant, the compressor can function as a backup, so only one ejector need be installed (depending on the capacity requirements).

In another embodiment of the invention an ejector can be installed in an existing plant already operating with a mechanical compressor in the cooling loop in order to increase the cooling capacity of the reduction zone and therefore the production capacity of the plant.

In another embodiment of the invention, two ejectors of different capacity may be installed. This arrangement allows flexibility in the operation of the plant. For example, the first ejector may be rated at 75% of the pre-designed flow rate capacity and the second ejector may be rated at 25% of the pre-designed flow rate capacity. With this arrangement, the recycle capacity may be set at 100% of the pre-designed flow rate capacity if both ejectors operate simultaneously, 75% of the recycle capacity if the second ejector is shut down and 25% of the recycle capacity if the first ejector is shut down. It is to be understood that many other combinations may be selected for two or three ejectors and increase the range of operational capacities, if so desired.

In a further embodiment of the invention, at least one ejector is installed connected in parallel with the cooling gas compressor, with the intention of minimizing the non-productive time and therefore production loss due to a plant shut-down due to problems of the cooling loop compressor. In such cases, operating the ejector(s) will permit continuing production while the compressor is repaired.

Referring now to FIG. 2, the embodiment shown there is similar to the direct reduction process of FIG. 1, except that the natural gas from source 16 is added before reformation directly to the cooled recycle reducing gas effluent from the reduction zone 12, which effluent, still containing significant amounts of $CO_2$ (in addition to some $H_2O$), is fed via pipe 26' to the in-line catalytic reformer 22 to produce an enhanced recycle reducing gas (now mainly composed of the reducing gases $H_2$ and CO). Pipe 37 in this FIG. 2 can be used to feed some of the cooling gas to fuel the reformer 22 (which also functions as a heater for the recycle reducing gas). The cooling zone and the arrangement of ejectors 80 and 94 is the same as shown in FIG. 1.

The embodiment shown in FIG. 3 comprises both an in-line catalytic reformer 22 and a separate supplemental heater 28, operating in parallel. The depleted reducing gas withdrawn at 46 from the reduction zone 12, after being cooled and scrubbed at 60 and pressurized at 68, is then split; with one portion recycling via lines 25 and 26 of the heat exchanger 48 and back on through the heater 28 to the reduction zone 12 via line 30, and with the other portion recycling via line 71 on through the reformer 22 and then back to the reduction zone 12 via lines 29 and 30. Make-up hydrocarbon gas can be supplied from sources 16, 34' to the reformer 22 or to the heater 28, respectively (as needed), through control valves 18, 38'. All of the natural gas/hydrocarbon gas sources in all of the drawings (including sources 16, 17, 34, 34', and 72) can optionally all be the same. The cooling zone and the arrangement of ejectors 80 and 94 is the same as shown in FIG. 1.

Figure 4:
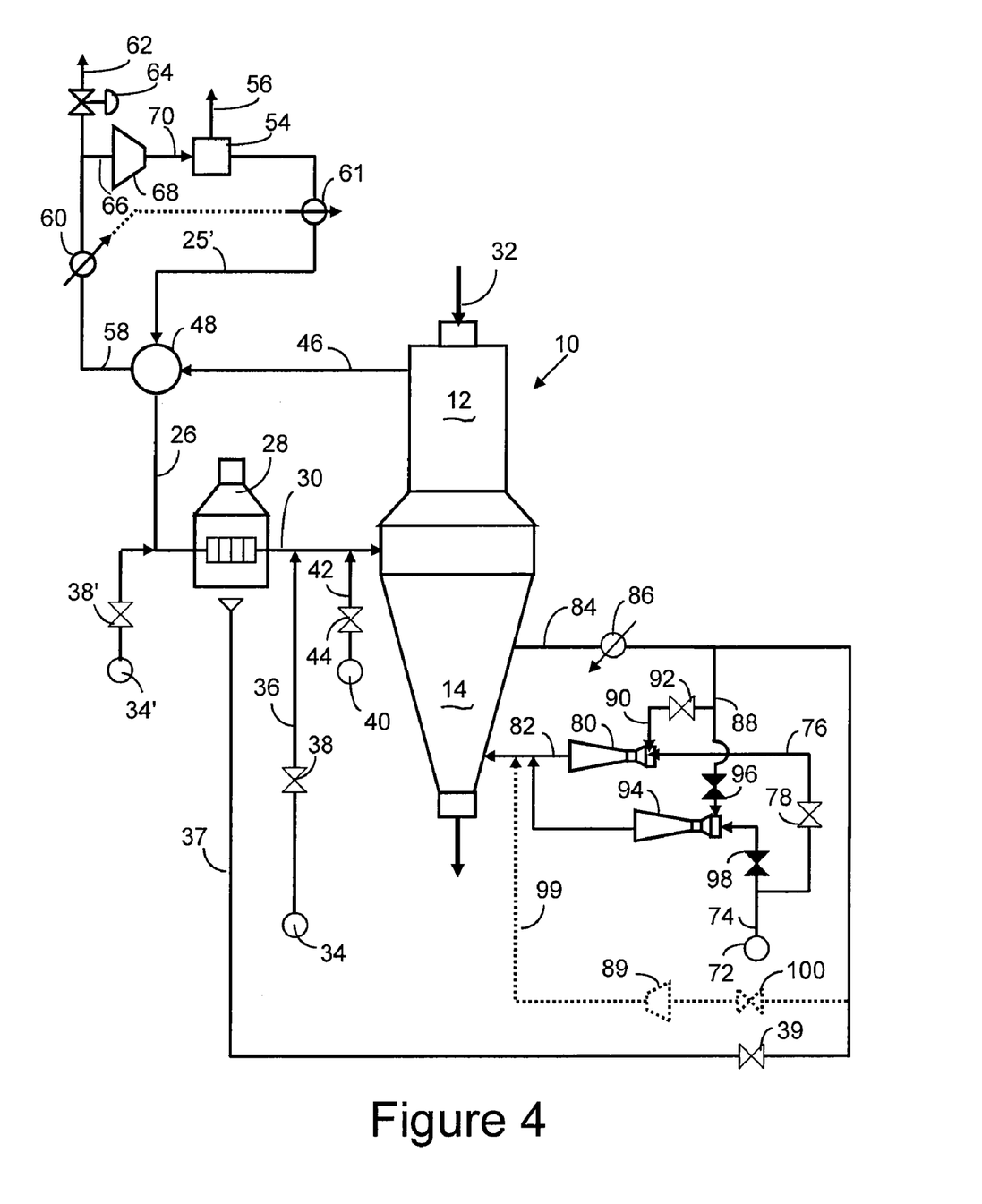
FIG. 4 is a schematic representation of a similar embodiment of the direct reduction process according to the present invention, also using an ejector in the cooling gas loop, but differing from the processes of FIGS. 1 to 3 in the configuration of the reducing gas loop (where no reformer at all is utilized in the reforming of natural gas).

With reference to FIG. 4, the illustrated direct reduction process does not have a catalytic reformer for producing the reducing gas. The hydrocarbon reformation instead is mainly carried out within the reactor 10 by reaction with steam from the humidifier 61 driven by the catalytic action of the DRI and of the iron-oxides-containing particles present in the reduction zone 12. Natural gas and/or other hydrocarbon make-up gas for such reformation can be added from either source 34 or 34' (controlled as needed by valves 38, 38', respectively). The temperature of the cleansed and humidified recycle reducing gas, stripped of $CO_2$ at 54, is advantageously first raised by passing through heat exchanger 48, with its related piping 25' & 26, then is increased by heater 28 to a temperature above about 850° C., and finally is combined in line 30 with a free-oxygen-containing gas from source 40 in order to boost the temperature further up to above about 1000° C. by a resulting partial combustion of the hydrocarbons etc. contained in such enhanced recycle reducing gas. Some of the cooling gas may be transferred from the cooling gas loop to feed the gas heater 28 by means of pipe 37 having valve 39 to regulate the flow rate of the transferred gas.

The cooling zone and the arrangement of ejectors 80 and 94 is the same as shown in FIG. 1.

EXAMPLE 1

The cooling gas compressor in a direct reduction plant with the embodiment of the process shown in FIG. 1 was substituted by an ejector utilizing as motive gas a stream of natural gas fed at a pressure of 12 kg/cm² absolute and at temperature of 25° C. The flow rate of natural gas fed to the ejector was 175 NCMH per metric Ton of Fe produced. The composition of natural gas was: 1.6% $H_2$; 1.1% $CO_2$; 93.3% $CH_4$; 0.5% $N_2$; 2.7% $C_2H_6$; and 0.8% $C_3H_8$. The flow rate of recycle cooling gas entering the ejector was 301 NCMH per metric ton of Fe produced at a pressure of 4.65 kg/cm2 absolute and with a composition as follows: 9.266% $H_2$; 0.129% CO; 0.207% $CO_2$; 89.089% $CH_4$; 0.474% $N_2$; and 0.836% $H_2O$.

A stream of cooling gas, effluent from the ejector at a pressure of 5.25 kg/cm2 absolute, entered the cooling zone at a flow rate of 476 NCMH per ton of Fe produced, at a temperature of 27° C. and having the following composition: 6.448% $H_2$; 0.082% CO; 0.535% $CO_2$; 90.637% $CH_4$; 0.484% $N_2$; 0.529 $H_2O$; 0.993% $C_2H_6$; and 0.294% $C_3H_8$. Savings in electric energy amount to about 4 KwH/Metric ton of Fe produced. Further savings, in the thousands of dollars, result from avoiding unnecessary maintenance and spare parts such as filters and lubricating oil required for the formerly-used mechanical compressor.

The present invention has been described with regard to some preferred embodiments, but those skilled in the art will be capable of contemplating other variants and modifications which are deemed to be within the scope of the invention, which scope should be ascertained from the claims which follow.

What is claimed is:

1. An apparatus for producing DRI comprising
    a reduction reactor having
        a reduction zone in its upper part and
        a cooling zone in its lower part;
    means for charging iron-oxide-containing particles to said reduction zone,
    a reducing gas recycle loop including as elements thereof
        said reducing zone,
        means for circulating a high-temperature reducing gas comprising $H_2$ and CO through said reduction zone to reduce iron oxide particles therein to produce hot DRI and a depleted residual reducing gas with $H_2O$ and $CO_2$ by-products,
        a cooler scrubber for removing $H_2O$ from the residual reducing gas,
        a $CO_2$ removal system for removing $CO_2$ from the residual reducing gas for yielding an upgraded recycle reducing gas,
        a heater for the upgraded recycle reducing gas,
        a source of free-oxygen-containing gas for feeding to said upgraded recycle reducing gas to further raise the temperature of such recycle gas and to react at least with hydrocarbons present in the recycle gas, and
        piping to join these cooling gas recycle loop elements;
    a cooling gas recycle loop including as elements thereof
        said cooling zone for cooling down said hot DRI,
        a cooler scrubber for cooling gas effluent piped from the cooling zone along said loop,
        one or more ejectors connected into said cooling gas recycle loop capable of functioning as the sole means for driving cooling gas through the cooling gas recycle loop and for mixing the motive gas with the cooled and scrubbed cooling gas upon being recycled to back to said cooling zone,
        a high-pressure natural gas supply from outside merchant source piped to each such ejector so as to serve as the motive gas for each such ejector, and
        piping to join these cooling gas recycle loop elements; and
    means for discharging cooled DRI from said cooling zone.

2. An apparatus according to claim 1, wherein at least one ejector and a compressor are arranged in parallel, with the compressor and any ejector being capable to be used exclusive of the compressor in the recycling of the cooling gas.

3. An apparatus according to claim 1, further comprising a plurality of ejectors with each ejector being appropriately connected to said source of said motive fluid.

4. An apparatus according to claim 3, wherein said ejectors are a pair arranged in parallel.

5. An apparatus according to claim 4, wherein said ejectors have different flow rate capacities.

6. An apparatus according to claim 4, wherein said ejectors are valved to enable the ejectors to be operated simultaneously or alternatively.

7. An apparatus according to claim 1, comprising only a single ejector in the cooling loop.

8. The process of claim 7, wherein said recycling of cooling gas is wholly by means of a plurality of ejectors arranged in parallel.

9. The process of claim 8, wherein said ejectors are a pair operating simultaneously.

10. The process of claim 8, wherein the recycling of cooling gas is performed by one of a pair of ejectors while the other ejector is on stand-by.

11. The process of claim 8, wherein the recycling of cooling gas is performed by a plurality of ejectors having different flow rate capacities.

12. In a process of reducing iron oxide-containing particles in a moving bed reduction reactor with a reducing gas formed therein from make-up gases mainly composed of gaseous hydrocarbon and $H_2O$ to produce direct reduced iron, DRI, said reactor having an upper reduction zone and a lower cooling zone, a reducing gas recycle loop including said reduction zone and a cooling gas recycle loop including said cooling zone, which process comprises:

feeding into the reduction zone iron oxide-containing particles, feeding into said reduction zone a hot enhanced recycle reducing gas and make-up gases largely comprised of $H_2$, CO, gaseous hydrocarbon, and $H_2O$, causing said gases to flow through the portion of the moving bed in the reduction zone to effect reduction of such particles therein and to effect reformation of gaseous hydrocarbon with $H_2O$ and any $CO_2$ therein to yield a resulting depleted residual reducing gas, said $H_2$ and CO being mainly derived by said reformation within said reactor, withdrawing the depleted residual reducing gas from said reduction zone for conditioning and recycling, depleting the $H_2O$ and $CO_2$ reduction reaction by-products from the depleted residual reducing gas to yield a resulting upgraded recycle reducing gas, re-heating the upgraded recycle reducing gas in a heater to above about 850° C., feeding make-up gases substantially comprised of gaseous hydrocarbon and $H_2O$ to said upgraded recycle reducing gas in said loop, feeding free-$O_2$-containing gas to said re-heated upgraded recycle reducing gas to further raise the temperature of such recycle gas to above about 1000° C. by partial combustion of at least the gaseous hydrocarbon to yield the hot enhanced recycle reducing gas used to feed the reduction zone and thereby complete the reducing gas recycle loop, flowing still-hot DRI from the reduction zone down into said cooling zone, circulating a cooling gas in said cooling gas recycle loop including through said cooling zone to cool-down said DRI, withdrawing from said cooling zone for recycling along said cooling loop at least a portion of said cooling gas warmed up after having cooled said DRI, cooling and scrubbing said withdrawn portion, mixing such withdrawn portion with a compatible pressurized make-up cooling gas, and thereafter recycling along the cooling gas including the make-up cooling gas back into said cooling zone thereby completing the cooling gas recycle loop, and discharging the cooled DRI from said cooling zone;

the improvement comprising the recycling of the cooling gas in said cooling gas recycle loop is wholly by means of one or more ejectors driven by the stream of cooling gas make up in the form of high pressure merchant-supplied natural gas as the motive power for each such ejector.

* * * * *